United States Patent
Ritter et al.

(10) Patent No.: US 7,579,584 B2
(45) Date of Patent: Aug. 25, 2009

(54) METHOD FOR CORRECTION OF AN IMAGE FROM A SERIES OF IMAGES ACQUIRED WITH AN X-RAY DETECTOR

(75) Inventors: Dieter Ritter, Fürth (DE); Christian Schmidgunst, Straubing (DE)

(73) Assignee: Siemens Aktiengesellschaft, Munich (DE)

( * ) Notice: Subject to any disclaimer, the term of this patent is extended or adjusted under 35 U.S.C. 154(b) by 325 days.

(21) Appl. No.: 11/607,718

(22) Filed: Dec. 1, 2006

(65) Prior Publication Data

US 2007/0147582 A1   Jun. 28, 2007

(30) Foreign Application Priority Data

Dec. 1, 2005   (DE) .................. 10 2005 057 667

(51) Int. Cl.
*G01D 18/00* (2006.01)
(52) U.S. Cl. .............. 250/252.1; 250/363.07; 250/370.11; 378/19; 378/64; 702/194
(58) Field of Classification Search .......... 250/252.1, 250/363.07, 370.11; 378/19, 64; 702/194
See application file for complete search history.

(56) References Cited

U.S. PATENT DOCUMENTS

| | | | |
|---|---|---|---|
| 5,530,238 A | | 6/1996 | Meulenbrugge et al. |
| 6,028,314 A | * | 2/2000 | Finkler .................. 250/370.11 |
| 6,901,135 B2 | * | 5/2005 | Fox et al. .................. 378/98.8 |
| 2004/0267507 A1 | * | 12/2004 | Stierstorfer .................. 702/194 |
| 2006/0276706 A1 | * | 12/2006 | Klein et al. .................. 600/407 |

FOREIGN PATENT DOCUMENTS

EP   1 113 293   12/2000

OTHER PUBLICATIONS

"Scintillation Crystals." Accessed Dec. 12, 2008: http://www.scionixusa.com/pages/navbar/scin_crystals.html.*
"A Ghost Story: Spatio-Temporal Response Characteristics of an Indirect-Detection Flat-Panel Imager," Siewerdsen et al, Med. Phys., vol. 26, No. 8 (Aug. 1999), pp. 1624-1641.

* cited by examiner

*Primary Examiner*—David P Porta
*Assistant Examiner*—Casey Bryant
(74) *Attorney, Agent, or Firm*—Schiff Hardin LLP

(57) ABSTRACT

In a method for correction of an image in a series of images acquired with an x-ray detector; wherein the x-ray detector is composed of a number of detector elements and an acquired image is composed of image elements associated with the detector elements, a series of detector signals is generated in a detector element by x-ray radiation, the detector signals respectively exhibiting a detector-specific temporal decay curve; and an image element to be corrected and acquired over a predetermined acquisition interval contains signal portions of the current and preceding detector signals acquired during this acquisition interval. By calculating signal portions of preceding detector signals acquired in the acquisition interval and subtracting them from the image element to be corrected, the image quality of an image from a series of images acquired with a digital image acquisition apparatus is improved.

9 Claims, 1 Drawing Sheet

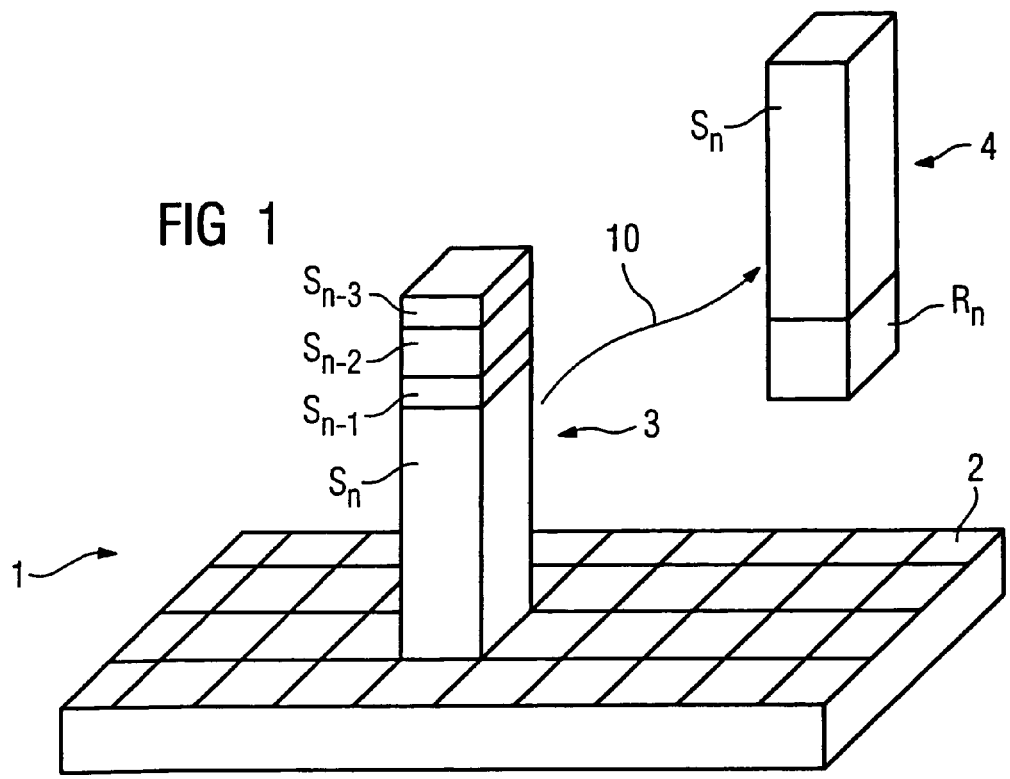
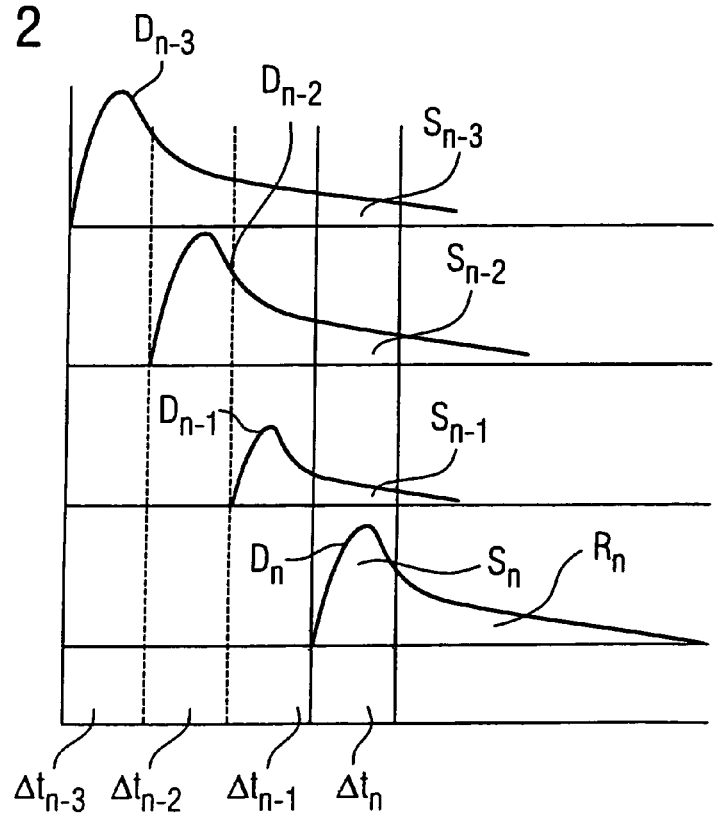

US 7,579,584 B2

METHOD FOR CORRECTION OF AN IMAGE FROM A SERIES OF IMAGES ACQUIRED WITH AN X-RAY DETECTOR

BACKGROUND OF THE INVENTION

1. Field of the Invention

The invention concerns a method for correction of an image from a series of images acquired with an x-ray detector.

2. Description of the Prior Art

It is known to acquire a series of images using an x-ray detector formed by a number of detector elements so the acquired image is formed of image elements associated with the detector elements. A series of detector signals is generated in the detector element by x-ray radiation, the detector signals respectively exhibiting a detector-specific temporal decay curve. An image element to be corrected and acquired over a predetermined acquisition interval contains signal portions of the current and preceding detector signals acquired during this acquisition interval.

Regardless of developments in the field of medical technology, in particular the imaging modalities such as computed tomography and magnetic resonance tomography, conventional x-ray systems remain an important instrument for medical diagnosis and patient monitoring. Many presently-used imaging systems in the x-ray field are still equipped with analog detector technology. The field of digital imaging (in particular in C-arm x-ray systems), however, is of increasing importance. The imaging method and the devices used for translation thus are significantly relevant to the quality of the acquired images. The criterion of spatial resolution is known for evaluation of the quality of the imaging or of the imaging method, and quantum efficiency is known as a criterion for noise ratios or detector sensitivity. However, previously-used analog imaging offers barely any improvement potential in the region of quantum efficiency and the resolution capability. For example, due to other weak points of the analog technology a further reduction of the x-ray dose proves to be difficult. Furthermore, dependencies on the earth's magnetic field occur as well as non-linearity in the signal reproduction. The introduction of digital imaging is therefore increasingly being implemented, for example in the form of flat panel detectors. It is sought to replace the analog image chain (i.e. image intensifier, camera optic, camera and A/D converter) with an optimally simple, digitally-operating device. Advantages of digital technology are, for example, its dynamic range, i.e. in the resolution capability for fine tissue, further dose reduction of the x-ray radiation (which enables first 3D applications for soft tissue for C-arm systems), the mobility of the apparatus, and the linearity of the signal reproduction. Digital imaging methods include intrinsic methods, photoconductor methods and scintillator methods. Of these three significant methods, by today's knowledge the greatest improvement potential in 3D x-ray acquisition technology is seen in the scintillator methods.

With scintillators, detection of x-ray radiation ensues by secondary processes that are triggered by the x-ray radiation. If an x-ray quanta penetrates into a scintillator layer, among other things light emission is triggered by excitation and relaxation of luminophore centers in the scintillator layer. This light emission is detected by photodiodes by being generated and collected. Solid-state defects that decay again after a certain lifespan arise in the scintillator layer due to the x-ray radiation. Both luminophore emission and defect generation are directly proportional to the intensity of the incident x-ray radiation. The decay of the solid-state defects can lead to a re-excitation of the luminophore centers in the scintillator layer due to electron emission of the defect, which leads to a new signal detection by the photodiode. In the intervening time, however, new x-ray radiation can already have struck the detector. The detector signal generated from temporally-preceding radiated x-ray radiation thus overlaps with a detector signal generated from current x-ray radiation. The result is that a preceding image is visible in the current image in attenuated form. A disadvantage of scintillators thus is the high afterglow constant, or decay constant, which is dependent on the defect ratio in the scintillator layer. Similar effects as for the scintillator also occur for the photodetector. The decay constants for the photodiode are smaller, but the initial intensity is significantly higher than in the scintillator. Both proportions of the afterglow therefore play a relevant role given today's time intervals for image acquisitions. The decay curves for scintillators and photodetectors overlap into a common decay curve which determines the decay behavior of the acquired image.

A test with regard to shadow (ghost) images for a silicon planar detector is known from the technical article "A ghost story: Spatio-temporal response of an indirect-detection flat panel imager", published in Med Phys. 26 (8) in August 1999. This test sought to remedy the occurring shadow images for a silicon planar detector by means of a rapid scanning method and a flood field method. Neither method delivered a satisfactory result. In the summary the author refers to the fact that the elimination of shadow images remains the subject of future work.

SUMMARY OF THE INVENTION

An object of the present invention is to improve the image quality of an image from a series of images acquired with a digital image acquisition apparatus.

This object is inventively achieved by a method wherein signal portions of respective predetermined detector signals acquired at an acquisition interval are calculated and subtracted from the image element to be corrected. The inventive method is normally applied when digital x-ray detectors (i.e. intrinsic detectors, detectors according to the photoconductor method and scintillator detectors) are used for the detection of x-ray radiation and an acquisition rate for an image series is provided that is so high that shadow images occur. In particular the scintillator detectors exhibit a high time constant for the afterglow, so a preceding image can be easily visible in an acquired image. The arising shadow images have a particularly strong effect, particularly given strong intensity fluctuations from high intensity to low intensity and given variations of the imaged structure in the image. If x-ray radiation strikes a detector element of the x-ray detector, a detector signal is generated that reaches its maximum value shortly after the irradiation and then decreases exponentially with the time, dependent on the decay constant. This decay of the detector signal is also called a decay curve and is the cause for the occurrence of the shadow images. The decay constant of the decay curve is detector-dependent. This particularly depends on the design and the mode of action of the detector as well as on the materials used for this. For example, the detector signals supplied by the detector elements in a specific acquisition interval are integrated for image generation. This is the respective signal portion of the detector signal contributing to the image element. Signal portions of those detector signals that are output by the detector (i.e. detector signals of preceding x-ray irradiations that have not yet entirely decayed) as well as the current detector signal (which is to be ascribed to an x-ray exposure of the detector occurring chronologically immediately prior) contribute to the acquired signal of the image element. Shadow image or shadow image elements of images, or image elements acquired in the preceding, therefore occur in the current image, or in an image element whose intensity is determined from the signal maximum, the detector-specific decay constant and its temporal distance from the current image acquisition. For example, maximum values of detector curves, average values of the detector curves within the acquisition interval or even integration values of the detector signal over an acquisition interval can be drawn upon as signal portions. The detector signals are normally the reflection of a current flow caused indirectly or directly by the x-ray irradiation.

The acquisition of an image normally ensues with a detector matrix whose smallest units form detector elements. The design of the detector matrix can be different dependent on the concept of the detector. A scintillator detector normally has a scintillator layer which is applied on a number of photodiodes. The photodiodes are arranged in lines and rows that form a detector matrix. Normally one image element (for example one pixel) is associated with each detector element of the detector matrix, i.e. in the cited example precisely one photodiode. A number of the smallest elements of the detector matrix, however, can also be associated with an image element. In order to correct an image to be corrected, the inventive method is implemented for each image element. The speed of the method can be increased by the utilization of focused selection criteria for the image elements to be corrected.

To implement the inventive method the decay curve of the detector must be known. This can be provided by the manufacturer of the detector or can be experimentally determined, for example by a calibration method. If the decay curve, the maximum level of a detector signal, and the time interval between an arbitrary preceding detector signal and a current detector signal are known, a signal proportion of an arbitrary preceding detector signal in the sum of the signal proportions of the image to be corrected can be determined. This can occur for an arbitrary number of preceding detector signals. If the respective signal portion of a preceding detector signal is determined, this can be subtracted from the signal portions of the image to be corrected. If this is implemented for sufficiently many preceding detector signals and for each image element, the current signal portion results after the subtraction of preceding signal portions from the signal portions of the image to be corrected. The image element can correspond to a single image point or a sum of image points. A shadow-free representation or a corrected image thus can be determined.

The inventive method can be implemented in existing devices without a change of the hardware of the existing devices. Furthermore, due to the inventive method the use of a suitable, expensive backlight method to reduce the silhouettes is not required. The inventive method is thus cost-effective. The correction is normally possible with high speed, which enables a corrected representation of the acquired images in real time. This is advantageous for making a diagnosis. The determination of the detector-specific decay curve by calibration of the detector can ensue once, which represents a small effort.

In an embodiment of the invention, the signal portion to be subtracted is calculated from the decay curve of the associated detector signal and the position of the acquisition interval relative to the decay curve. From this the proportion of the decaying signal portion in the temporally successive image elements (acquired with specific temporal distance) can be determined from an already-corrected preceding image element by means of the decay curve and a known image acquisition rate. The portion of preceding corrected image elements to be subtracted is constant for a predetermined image acquisition rate and a specific temporal distance from the subsequently acquired image element and can therefore be easily determined. The calculation of the signal portions to be subtracted thus can be implemented simply and quickly, which enables a corrected real-time representation of the image element or of the image.

In a preferred embodiment of the invention a subsequent, unacquired signal remainder (following the acquisition interval) of the current detector signal is added to the image element to be corrected. The signal portion corresponding to the entire detector signal generated by the x-ray irradiation (i.e. current signal portion plus signal remainder of the current detector signal) is determined, and thus the correct signal level of the image element actually associated with the x-ray radiation. If this corrected addition is implemented as of the first acquired image element, signals of the image elements (which signals correspond to the actual x-ray radiation) can be determined in this manner for all further image elements acquired in the following. The signal remainder to be added is advantageously calculated as a fraction of the current detector signal. The signal remainder to be added is directly proportional to the radiated intensity of the x-ray radiation, and corresponds to the proportion of the incident x-ray radiation stored in the defects in the scintillator and not registered in the acquisition interval, and thus can be easily determined. The signal remainder thus represents a fraction of the actual corresponding detector signal in the detector element due to x-ray radiation. Dependent on the image acquisition rate portions of this signal remainder occur as shadows in the successive image elements, and these shadows can be calculated by means of the decay curve and subtracted from the image element to be corrected.

In another embodiment of the invention, a specific, determinable number of signal portions of preceding detector signals is subtracted from the image to be corrected. Since the signal portion of preceding detector signals in an image to be corrected is determined by the decay constant of the decay curve, the maximum of the respective detector signal, and the temporal distance from the current acquisition, it is appropriate to not remove all preceding detector signals from the image to be corrected, since a majority of the preceding detector signals (temporally removed from the current detector signal) already exhibit a magnitude or signal level that lies in the order of magnitude of the signal noise of the detector. These detector signals thus also supply no significant signal portion for an image to be corrected. The effort for image correction can thus be reduced in that the method is applied only to a specific number of preceding detector signals and the remaining preceding detector signals are disregarded. In practice it has proven to be advantageous that the number of the preceding detector signals to be removed is at most five. Due to the temporal proximity of the five immediately preceding detector signals, these normally exhibit the greatest influence on the image to be corrected. Normally a shadow-free or corrected image can be generated by removal of the signal portions associated with the preceding detector signals from the image to be corrected.

In a further embodiment of the invention, for each signal portion a measured value representing its magnitude is determined and those signal portions of preceding detectors whose measured values exceed a predeterminable threshold are removed from the image to be corrected. By an evaluation of the magnitude and therewith of the contribution of the signal portion of a preceding detector signal relative to the image to be corrected, those signal portions of preceding detector signals can be determined which have the greatest influence on the image to be corrected. The measured value can be determined, for example, as a value of the integral of the detector signal in the acquisition interval. By utilization of a threshold for determination of the contribution of signal portions of preceding detector signals for the subsequently-measured signal portions, an identification and removal of the significant signal portions of preceding detector signals can be ensured even for temporally large intervals between current detector signal and a preceding detector signal.

In another embodiment of the invention, a grayscale value for an image representation is associated with each corrected image element. The correction of the image to be corrected normally leads to a change of the magnitude of the sum of the signal portions for an image element. It is appropriate to output the image or of an image element on an image display only after correction by the inventive method. The output normally ensues as a grayscale image, but a color representation can also be realized. By the association of brightness values, colors, etc. with the signal portions of the corrected image and omission of an association of brightness values, colors, etc. for an acquired image, the number of calculation steps required for association does not increase. The calculation steps required for association thereby comprise the conversion of a signal portion or a sum of signal portions into, for example, a brightness value. Furthermore, it has proven to be advantageous to window the grayscale value. 16-bit grayscale images of a patient, which can show 65536 gray tones, are normally acquired. The human eye is not able to separately perceive all of these gray tones, but only differentiates between approximately 150 gray tones. The significant information (i.e. information relevant to the examination) of the grayscale image is therefore converted into an 8-bit grayscale image which contains only 256 gray tones (grayscale gradations) and is limited to an interval within the 65536 gray tones.

In an embodiment of the invention, for a provided acquisition rate of the image series and given the existence of an exponential decay curve (characterized by a decay constant) of the detector signals, the decay constant is of the same order of magnitude as the acquisition rate. There exist two border cases for which the method cannot be appropriately used. One case is that the acquisition rate of the image series can be so small (meaning that the temporal distance between two successive images is such) that the detector signals of an image acquired in the preceding have decayed to a negligible detector signal level upon acquisition of a directly-following image. The image acquired in the preceding thus is not visible in the image subsequently acquired. The inventive method is not required. Another case is that the acquisition rate for a given detector (for example a scintillator detector) can be selected so high that a high number of images acquired in the preceding must be removed from the current acquired image in order to obtain a silhouette-free image. The method thereby requires more calculation time and is inefficient, which reduces the practicality of the method. The method is appropriately applicable precisely when the decay constant of the exponentially-decaying decay curve is of the same order of magnitude as the acquisition rate of the image series. This is important given the scintillator detectors already mentioned above, whose advantage is, among other things, in exhibiting a high sensitivity to x-ray radiation given relatively advantageous manufacture. However, due to the relatively high decay constant of the scintillator layer an afterglow occurs which causes silhouettes given acquisition rates that are possible today (of, for example, 30 images per second and less). Due to a further increase of the acquisition rate this effect can also be important for semiconductor detectors and other detector types. This method can therefore, for example, also be applied for digital high speed acquisitions in the camera and film fields.

The corrected images can be particularly advantageously used for determination of a spatial representation of an examination subject from different acquisition directions. The method can then be used particularly appropriately for an acquisition of image series when image contents of successive images change but exhibit similarities. This applies to the spatial imaging methods of x-ray technology. For example, an x-ray acquisition system is thereby rotated around a patient and two-dimensional images of the patient are simultaneously acquired with high image acquisition rate from different directions. Due to the high image acquisition rate silhouettes of images acquired in the preceding occur in subsequently-acquired images. If the shadows are not corrected, it leads to adulterations of the image contents predetermined by an examination subject, which adulterations affect the reconstruction for spatial representation of a patient section. Due to the shadows artifacts are acquired in the spatial representation which must be taken into account in the diagnosis. Due the correction of the images before implementation of the reconstruction by the inventive method, the generation of artifacts of the spatial representation is suppressed. The diagnosis reliability is therewith improved, or the effort of the medical personnel to recognize flawed representations caused by shadows is therewith reduced.

DESCRIPTION OF THE DRAWINGS

FIG. 1 is a portion of a detector with detector elements and a signal of an image element to be corrected, the signal being associated with a detector element.

FIG. 2 shows a chronological series of detector signals.

DESCRIPTION OF THE PREFERRED EMBODIMENT

FIG. 1 shows a portion of a detector 1 for detector of x-ray radiation. The detector comprises a scintillator layer (for example composed of CsI needles) and an array formed by photodiodes that use amorphous silicon for detection of the visible light generated by the scintillator. The energy of the x-ray radiation striking the CsI layer is for the most part converted into visible light by secondary processes; the energy is in part stored in the form of defects in the CsI as well as in the amorphous silicon. These defects decay after a median decay duration and lead to the detection via generation of visible radiation in the CsI, or by release of charge in amorphous silicon, lead to the output of a signal to the electronic connected to the detector. Due to an incident x-ray radiation, each photodiode supplies a signal contribution to the acquired image and forms a smallest detected unit or, respectively, a detector element 2 of the detector 1. The spatial resolution of the image is thus significantly influenced by the number of photodiodes present.

The image contains signal portions delivered from the detector elements 2. These signal portions are spatially distributed due to the arrangement of the detector elements 2. Each signal supplied by a detector element 2 of the detector 1 also represents a temporal accumulation of signal portions $S_{n-1}$, $S_{n-2}$ and $S_{n-3}$ of detector signals $D_{n-1}$, $D_{n-2}$ and $D_{n-3}$ respectively, detected in the preceding as well as of the current signal portion $S_n$ of the current detector signal $D_n$ (likewise shown in FIG. 2). The index is a natural number that designates the n-th image exposure. The indices n-1, n-2, n-3 thus designate a first, second and third image or image element temporally preceding the n-th image or image element 3. The signal portions $S_n$, $S_{n-1}$, $S_{n-2}$ and $S_{n-3}$ associated with the image elements for an acquisition interval $\Delta t_n$ (see FIG. 2) are indicated in FIG. 1 by a bar portion of a total bar whose height or magnitude corresponds to the sum of the signal portions $S_n$, $S_{n-1}$ and $S_{n-2}$, and $S_{n-3}$ of the image element 3 to be corrected. In detail, the height of the bar represents the signal portion $S_n$ and three preceding signal portions $S_{n-1}$, $S_{n-2}$ and $S_{n-3}$ of preceding detector signals $D_{n-1}$, $D_{n-2}$ and $D_{n-3}$ (see FIG. 2). The first acquired image element is normally thus a shadow-free image element since it is the first image element of an image series and no image element acquired before the first image element exists within this image series.

The proportion of the signal portions $S_{n-1}$, $S_{n-2}$ and $S_{n-3}$ of preceding detector signals $D_{n-1}$, $D_{n-2}$ and $D_{n-3}$ (see FIG. 2) decrease exponentially with time, which here corresponds to the area between the detector signal $D_n$, $D_{n-1}$, $D_{n-2}$, and $D_{n-3}$ and the time axis during an acquisition interval $\Delta t_n$ (see FIG. 2). In their decay behavior they follow a detector-specific decay curve which is determined by the maximum intensity of detector signal $D_n$, $D_{n-1}$, $D_{n-2}$ and $D_{n-3}$ (see FIG. 2) and the decay constant of the decay curve. A steady reduction of signal portions $S_n$, $S_{n-1}$, $S_{n-2}$ and $S_{n-3}$ of detector signals $D_n$, $D_{n-1}$, $D_{n-2}$ and $D_{n-3}$ (see FIG. 2) thus ensues for a temporally increasingly separated, subsequent image element 3 to be corrected. At a specific temporal distance, the proportion of the signal portions $S_n$, $S_{n-1}$, $S_{n-2}$, and $S_{n-3}$ of a preceding image element at a currently-acquired image element 3 is thus normally negligibly small. This temporal distance can be, for example, three acquisition cycles.

The signal portions $S_{n-1}$, $S_{n-2}$, and $S_{n-3}$ which, as a series of a preceding x-ray exposure, occur from x-ray exposures of the detector 1 implemented in the preceding, can be determined for a subsequent, temporally specifically spaced image element 3 to be corrected, which determination is made from an experimental determination of the decay behavior of a detector signal $D_n$, $D_{n-1}$, $D_{n-2}$, and $D_{n-3}$ (shown in FIG. 2). Which proportion of the incident x-ray radiation is stored in the detector 1 is known from the decay curve. This proportion of a signal remainder $R_n$ of the current detector signal $D_n$ (which signal remainder $R_n$ is stored in the detector) (see FIG. 2) is constant for a predetermined image acquisition rate and a predetermined acquisition interval and is output in the subsequent image elements as a silhouette with a specific signal portion on an image to be corrected. In order to acquire a shadow-free and intensity-corrected image element 4, it is required not only to subtract the signal portions $S_{n-1}$, $S_{n-2}$, and $S_{n-3}$ of preceding detector signals $D_{n-1}$, $D_{n-2}$ and $D_{n-3}$ from the image element 3 to be corrected, but rather also to add the signal remainder $R_n$ of the current detector signal $D_n$ to the signal portion $S_n$ of the current detector signal $D_n$. The step of the addition of the signal remainder $R_n$ of the current detector signal $D_n$ and the subtraction of the preceding signal portions $S_{n-1}$, $S_{n-2}$, and $S_{n-3}$ from the image element 3 to be corrected is designated with the reference character 10 in FIG. 1.

Furthermore, from the decay curves that signal portion $S_{n-1}$, $S_{n-2}$, and $S_{n-3}$ from the preceding image elements (already corrected in the same manner) can be determined that, of a preceding detector signal $D_{n-1}$, $D_{n-2}$, and $D_{n-3}$ (see FIG. 2), still adds to subsequently acquired signal portions $S_n$ of an image element 3 to be corrected after a determined elapsed time. These portions stemming from preceding detector signals $D_{n-1}$, $D_{n-2}$, and $D_{n-3}$, which add to the current signal portion $S_n$ of an image element 3 to be corrected, can be obtained by means of the calibration via multiplication of the associated corrected image element with a factor. The factor is determined from the temporal spacing of the preceding detector signal $D_{n-1}$, $D_{n-2}$, and $D_{n-3}$ from the current detector signal $D_n$ and the decay curve. The preceding signal portions $S_{n-1}$, $S_{n-2}$, and $S_{n-3}$, which are to be removed from an image element 3 to be corrected, can thus simply be calculated via the known decay behavior and already-corrected preceding image elements and be subtracted from the sum of the signal portions $S_n$, $S_{n-1}$, $S_{n-2}$, and $S_{n-3}$ of a current image element 3 to be corrected. Given implementation of the method for all image elements-3 to be corrected, a corrected image can be determined.

FIG. 2 shows a temporal series of detector signals $D_n$, $D_{n-1}$, $D_{n-2}$, and $D_{n-3}$ which are output by a detector 1 (shown in FIG. 1) as a series of an x-ray irradiation of a detector element 2 of the detector 1 (both respectively shown in FIG. 1). For image generation, the detector signals $D_n$, $D_{n-1}$, $D_{n-2}$, and $D_{n-3}$ are acquired or measured during the acquisition intervals $\Delta t_n$, $\Delta t_{n-1}$, $\Delta t_{n-2}$ and $\Delta t_{n-3}$ etc. associated with them by integration of the output detector signals $D_n$, $D_{n-1}$, $D_{n-2}$, and $D_{n-3}$ with signals from the detector 1 from FIG. 1. These detector signals $D_n$, $D_{n-1}$, $D_{n-2}$, and $D_{n-3}$ integrated during the acquisition interval $\Delta t_n$, $\Delta t_{n-1}$, $\Delta t_{n-2}$, and $\Delta t_{n-3}$ are designated as signal portions $S_n$, $S_{n-1}$, $S_{n-2}$, and $S_{n-3}$. However, not only the current signal portion $S_n$ of the current detector signal $D_n$ but rather also signal portions $S_{n-1}$, $S_{n-2}$, and $S_{n-3}$ of preceding detector signals $D_{n-1}$, $D_{n-2}$, and, $D_{n-3}$ contribute to the signal portions $S_n$, $S_{n-1}$, $S_{n-2}$, and $S_{n-3}$ detected during a specific time interval, for example $\Delta t_n$. Depending on the level of the maximum of the respective preceding detector signal $D_{n-1}$, $D_{n-2}$ and $D_{n-3}$ and the temporal spacing of the preceding detector signals $D_{n-1}$, $D_{n-2}$ and $D_{n-3}$ relative to the current acquisition interval $\Delta t_n$, the signal portion $S_{n-1}$, $S_{n-2}$, and $S_{n-3}$ of the preceding detector signals $D_{n-1}$, $D_{n-2}$, and $D_{n-3}$ can be of different size. It is particularly relevant for the occurrence of silhouettes when a current detector signal $D_n$ with low maximum intensity follows a directly preceding detector signal with high maximum intensity (for example the detector signal $D_{n-1}$). The contribution of the preceding signal portion $S_{n-1}$ to the sum of the signal portions $S_n$, $S_{n-1}$; $S_{n-2}$, and $S_{n-3}$ of the image or image element 3 to be corrected is thereby of the same order of magnitude or greater than that of the current signal portion $S_n$. In an image or image element 3 acquired under these relationships an image or image element acquired in the preceding is thus clearly visible.

The signal portion $S_n$ of the current detector signal $D_n$ and the signal portions $S_{n-1}$, $S_{n-2}$, and $S_{n-3}$ of the preceding detector signals $D_{n-1}$, $D_{n-2}$, and $D_{n-3}$ sum to the signal portions of the image or image element 3 to be corrected. By a subtraction of the signal portions $S_{n-1}$, $S_{n-2}$, and $S_{n-3}$ of the preceding detector signals $D_{n-1}$, $D_{n-2}$, and $D_{n-3}$ which can be determined a priori with the aid of the experimentally determined decay curve, the image or image element 3 to be corrected can thus be relieved of shadows or shadow elements. The current signal portion $S_n$ of the current detector signal $D_n$ results. However, a further correction of the image or, respectively, of the image element 3 is appropriate, given which a remainder signal portion $R_n$ of the current detector signal $D_n$ is added to the current signal portion $S_n$. An actual signal level that is not adulterated by the detector 1 (see FIG. 1) thus can be determined for the current detector signal $D_n$. The image element 3 to be corrected is thus transferred over into a corrected image element 4. If this method is applied for all image elements 3 of an image, a silhouette-free representation thus results for an entire image. Given application of the inventive method to each image of the image series, a corrected image series results.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for correcting x-ray images, comprising the steps of:

in a calibration procedure, irradiating an x-ray detector with x-rays, said x-ray detector comprising a plurality of detector elements, each of said detector elements emitting a series of detector signals upon being irradiated with said x-rays, and each of said detector signals exhibiting a detector-specific exponential decay curve having a decay constant, and identifying said decay curve in said calibration procedure;

after said calibration procedure, irradiating said x-ray detector with x-rays to acquire a series of images from the x-ray detector at an acquisition rate, each of said images being comprised of image elements respectively associated with the detector elements; and only if said decay constant is of a same order of magnitude as said acquisition rate, computationally correcting each image in said series in a processor on an image element-by-image element basis, with each image element to be corrected having been acquired during a predetermined acquisition interval and comprising respective signal contributions that are dependent on said detector-specific exponential decay curve, to a total signal represented by that image element, from a current detector signal in said series and a plurality of preceding detector signals in said series, said current detector signal having been acquired at a point in time during the predetermined acquisition interval and said preceding detector intervals having been respectively acquired at said point in time during different preceding predetermined acquisition intervals; and in said processor, automatically electronically calculating said signal contributions of said preceding detector signals in said predetermined acquisition interval to obtain calculated contributions, and subtracting said calculated contributions from the total signal represented by the image element to be corrected, to obtain a corrected image that is emitted as an output from said processor.

2. A method as claimed in claim 1 comprising automatically electronically calculating said calculated contribution using the detector-specific temporal decay curve for the respective detector signals, and the respective preceding predetermined acquisition interval during which the preceding detector signals were acquired.

3. A method as claimed in claim 1 comprising adding a contribution of an unacquired signal remainder of said current detector signal, occurring subsequently to said predetermined acquisition interval, to said total signal represented by said image element.

4. A method as claimed in claim 3 comprising automatically electronically calculating said signal remainder as a fraction of said current detector signal.

5. A method as claimed in claim 1 comprising predetermining a number of said preceding detector signals for inclusion in the calculation of the calculated signal contribution.

6. A method as claimed in claim 5 comprising predetermining said number to be at most five.

7. A method as claimed in claim 1 comprising, in the calculation of said calculated contribution, including respective signal contributions only of respective preceding detector signals having a magnitude that exceeds a predetermined threshold.

8. A method as claimed in claim 1 comprising associating a greyscale value with each corrected image element.

9. A method as claimed in claim 8 comprising windowing said greyscale value.

* * * * *